(12) United States Patent
Gill

(10) Patent No.: US 11,008,896 B2
(45) Date of Patent: May 18, 2021

(54) WATER DRIVEN TURBINE STEAM ENGINE

(71) Applicant: Jonathan Paul Gill, St. Josef (AT)

(72) Inventor: Jonathan Paul Gill, St. Josef (AT)

(*) Notice: Subject to any disclaimer, the term of this patent is extended or adjusted under 35 U.S.C. 154(b) by 0 days.

(21) Appl. No.: 15/344,563

(22) Filed: Nov. 6, 2016

(65) Prior Publication Data
US 2017/0130611 A1 May 11, 2017

Related U.S. Application Data

(60) Provisional application No. 62/252,284, filed on Nov. 6, 2015.

(51) Int. Cl.
*F01K 11/02* (2006.01)
*F01K 21/04* (2006.01)

(52) U.S. Cl.
CPC ........... *F01K 11/02* (2013.01); *F01K 21/047* (2013.01); *Y02E 10/46* (2013.01)

(58) Field of Classification Search
CPC ... F01K 3/00; F01K 7/00; F01K 11/00; F01K 17/00; F01K 21/00; F01K 11/02
See application file for complete search history.

(56) References Cited

U.S. PATENT DOCUMENTS

| | | | | |
|---|---|---|---|---|
| 3,401,277 A * | 9/1968 | Larson | ............... | F01K 25/04 310/11 |
| 3,857,244 A * | 12/1974 | Faucette | ............... | F24T 10/10 60/641.2 |
| 4,166,362 A * | 9/1979 | Laurent | ............... | F01K 25/085 376/402 |
| 4,380,960 A * | 4/1983 | Dickinson | ............... | F01K 3/188 110/238 |
| 5,329,758 A * | 7/1994 | Urbach | ............... | F01K 21/047 60/39.17 |
| 5,829,255 A * | 11/1998 | Sitnyakovsky | ............... | F01K 9/003 60/688 |
| 6,237,543 B1 * | 5/2001 | Charoton | ............... | F01D 11/06 122/414 |
| 9,644,615 B2 * | 5/2017 | Chaix | ............... | F01K 3/186 |
| 2010/0212316 A1 * | 8/2010 | Waterstripe | ............... | F01D 1/023 60/641.2 |
| 2011/0154822 A1 * | 6/2011 | Protz | ............... | F01K 19/08 60/651 |
| 2015/0330261 A1 * | 11/2015 | Held | ............... | F01D 11/003 60/326 |
| 2017/0247993 A1 * | 8/2017 | Parrella | ............... | E21B 43/24 |

FOREIGN PATENT DOCUMENTS

GB   1241953   * 11/1971

* cited by examiner

*Primary Examiner* — Michael C Zarroli

(57) ABSTRACT

A closed loop steam engine that transfers its motive power to a flow of water using a steam injector. The resulting water jet then drives a turbine, is cooled in a heat exchanger to extract useful heat and then return to the steam injector water inlet. Part of the flow of water is reused as feed water to the boiler.

8 Claims, 2 Drawing Sheets

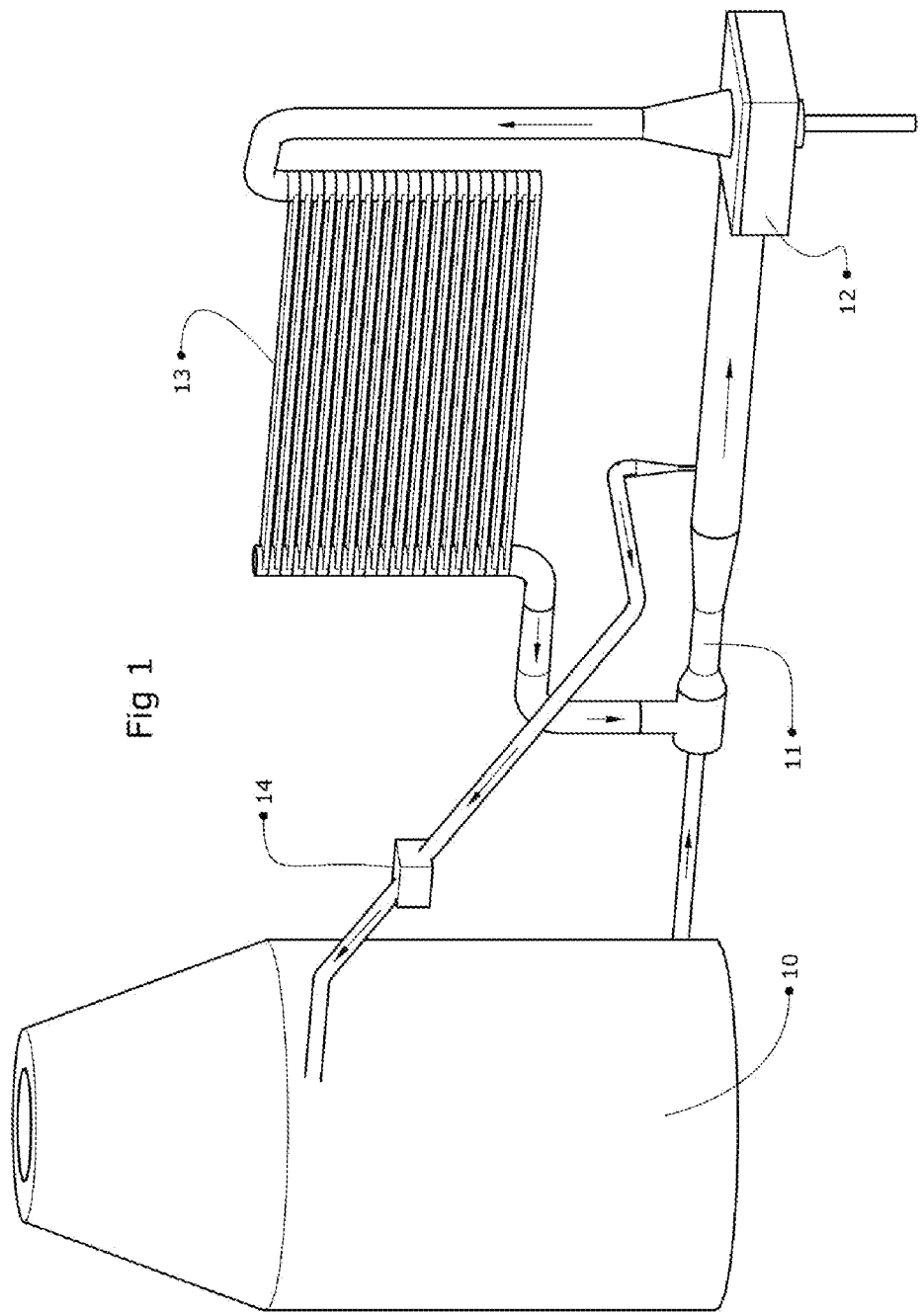

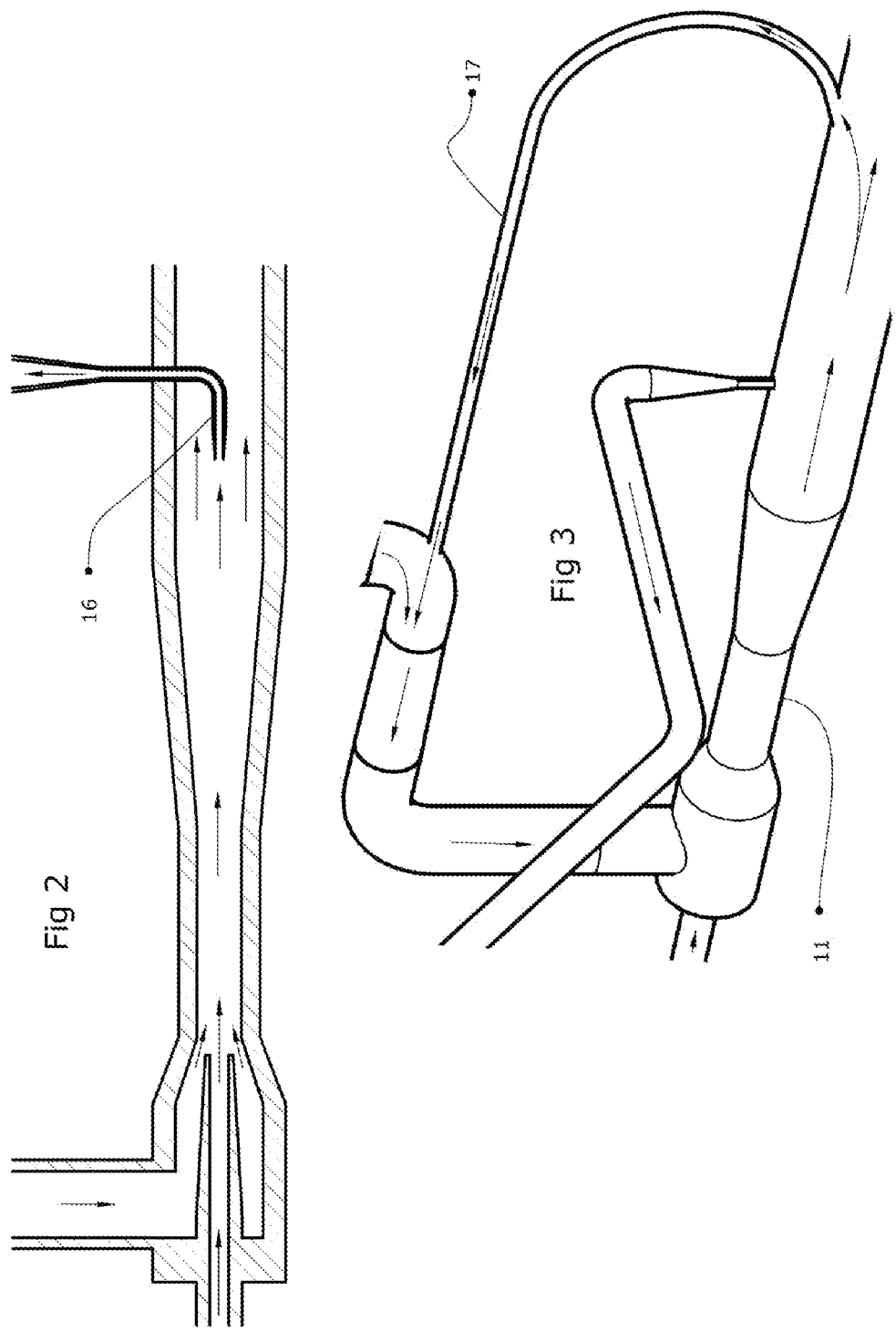

WATER DRIVEN TURBINE STEAM ENGINE

CROSS REFERENCES TO RELATED APPLICATIONS

This application claims the benefit of U.S. Provisional Application No. 62/252,284, filed Nov. 6, 2015.

STATEMENT REGARDING FEDERALLY SPONSORED RESEARCH OR DEVELOPMENT

Not Applicable

MICROFICHE APPENDIX

Not Applicable

BACKGROUND OF THE INVENTION

Field of the Invention

The invention relates to the field of steam engines. More specifically the invention comprises a type of steam engine that minimizes the size and number of moving parts of the engine by reducing the time the working fluid (usually water, but can also be other fluids) spends in its gaseous phase.

Background

There are many variations of steam engines. Most of these however are rather large and complex with numerous moving parts. They are usually expensive to produce and have high maintenance requirements as well as being very large for their power output. Therefore the use of steam power has largely been limited to large scale industrial applications or small scale models. Currently there are very few if any affordable, safe, small, low maintenance steam engines. This invention seeks to provide such an engine. One of the main challenges when designing a steam engine is that the higher the temperature of the steam, the more costly the engine becomes to produce and maintain. Superheated steam of high temperature is desirable for reasons of efficiency, however this creates multiple problems. Steel softens significantly above temperatures of 500° C. and other materials are expensive. Steam turbines are precision made to very small tolerances, run at high RPMs and are expensive to maintain and repair. Piston type steam engines have sealing problems, usually need to be oiled for lubrication and therefore often suffer oil being mixed into the water.

Most steam engines therefore limit the steam temperature to around 400° C. This invention circumvents all these problems by converting the energy of the steam into momentum energy of a moving flow of water. This allows low temperature and low cost materials to be used, thus making production and maintenance easier and the engine safer, whilst only limiting the steam temperature to the maximum temperature the heat exchanger can tolerate. There have been attempts to use a steam driven stream of water to drive a turbine before (see U.S. Pat. No. 54,469. May 1, 1866, F. Millward, Rotary Steam Engine or U.S. Pat. No. 554,073, Feb. 4, 1896, J. M. Miller & W. L. B. Collins, Momentum Engine), however these are open systems and do not consider the whole cycle. This invention seeks to integrate all elements into a cycle, so that no water is lost or has to be added, the momentum of the water is preserved, as well as minimizing heat losses in the system and extracting useful heat (for use in combined heat and power applications) via a heat exchanger.

BRIEF SUMMARY OF THE INVENTION

The present invention comprises a closed loop steam engine that transfers its motive power to a flow of water using a steam injector. The resulting water movement then drives a turbine, is then cooled in a heat exchanger to extract useful heat and returns to the steam injector water inlet. Part of the flow of water is reused as feed water to the boiler.

BRIEF DESCRIPTION OF THE SEVERAL VIEWS OF THE DRAWINGS

FIG. 1 illustrates a diagram of the physical layout of the main parts of the engine.

FIG. 2 illustrates a cross section through the injector and adjoining pipes.

FIG. 3 illustrates the added bypass from the outlet of the steam injector back to the inlet of said steam injector.

Arrows in the drawings show the flow direction of the fluid in the system.

REFERENCE NUMERALS IN THE DRAWINGS

10 Steam Boiler
11 Steam Injector
12 Turbine
13 Cooler/Radiator
14 Pump or control valve
16 Water takeoff to boiler
17 Bypass
18 Control valve

DETAILED DESCRIPTION OF THE INVENTION

Illustrated in FIG. 1 is a perspective view of the basic layout of the parts that make up the engine. The present invention comprises a closed loop steam engine that is made up of the following parts. A boiler/steam generator 10 to create steam, a steam injector 11 that uses the steam from the boiler to propel a flow of water that then drives a turbine 12. A heat exchanger 13 that receives the warm water that exits the turbine in order to extract the excess heat and then feed it back into the water inlet of the steam injector. Part of the water flow is diverted from the steam injector outlet or the turbine outlet or the heat exchanger outlet to feed back into the steam boiler.

The heat exchanger can be of any type that exchanges heat with a liquid, for instance liquid/gas or liquid/liquid heat exchangers such as convectors or plate heat exchangers. There can be a pump 14 and/or a control valve attached to assist the flow into the boiler if necessary. This pump can be separate or connected directly to the turbine shaft in order to minimize the number of moving parts or even another steam injector. FIG. 2 shows a cross section of the steam injector and the pipe 16 transporting the feed water back to the boiler. The feed-water pipe can be joined to a hole in the pipe coming out of the injector or as shown in FIG. 2 suspended in the water flow so as to have part of the water forced into it. The flow rate is dependent upon the cross section of the pipe as well as the current pressure and velocity of the water. If the engine is only used in a steady state application (one operating point), the system can be designed to run without a pump 14, although start-up may be difficult.

The turbine ideally should be enclosed with no voids or pockets of air or other gasses, so that no momentum is lost. Ideally this would be a Francis, Kaplan, Tesla or even a simple fixed propeller turbine.

Research has shown, that the efficiency of a steam injector increases as the difference in velocity of the steam and water decreases. Thus it is important to maximize the speed of the water entering the steam injector. In order to do this it is either necessary to not extract all the momentum from the water when flowing through the turbine, or to create a bypass 17 for part of the water coming out of the steam injector to be re-injected into the water of the inlet of said steam injector. A regulator valve can be added for more precise control over the amount of feedback of the bypass. Also additional cooling via a second heat exchanger can be provided for this bypass or the bypass can lead to the inlet of the main heat exchanger instead of the steam injector. FIG. 3. shows where the bypass 17 would be placed. The bypass can be connected in the same way the feed-water pipe is shown to be connected in FIG. 2 or simply connected to a hole in the pipe coming from the injector.

The boiler 10 can be of any type, however a water-tube boiler of compact design that can safely deliver high temperature superheated steam is preferred. As the water is in a closed system there should be no problems with scale and other impurities.

The connections between the individual parts of the engine as well as the bypasses can be made with hoses, pipes, carved pathways or any other conceivable way to keep water enclosed and flowing from one part to the next.

The engine can use not just water but also any other suitable liquid, the proper vapor thereof being used to drive the injector, the injector then being a gas-into-liquid injector compatible with that fluid. In cold climates for instance it is a good idea to use a water/ethanol mix as the working fluid in order to guard against freezing.

Best Mode of Implementation

In the preferred embodiment of the invention the steam boiler is of the monotube design, more specifically a flash boiler. This is mainly for safety reasons, as a monotube/flash boiler, even if failure should occur will not create a deadly explosion. The turbine is a Tesla turbine, as these are very easy and cheap to manufacture, tolerate accidentally non condensed steam quite well and have low maintenance requirements. There is a bypass from the outlet of the steam injector through a low friction heat exchanger to cool the water and then leading back into the inlet of said steam injector. A valve regulates the amount of water in the bypass so as to keep the velocity of the water going into the steam injector in the optimal range. The main heat exchanger is a liquid/liquid heat exchanger that uses the waste heat in a combined heat and power application. The water is injected back into the steam boiler via a pipe/connection that diverts part of the flow of water from the steam injector outlet. This is assisted by an electrical pump to ensure reliable start up. The pump only assists when not enough pressure is available from the steam injector flow. A valve regulates the amount of admitted water into the boiler according to the water level in the coils.

Having described my invention, I claim:

1. A heat engine, comprising:
    a boiler,
    a gas-into-liquid injector, wherein the boiler is configured to direct a flow of gas to the gas inlet of the injector and the injector is configured to direct part of the resulting flow of liquid to the inlet of the boiler,
    a turbine, wherein the injector is configured to direct part of the propelled flow of liquid to the inlet of the turbine,
    a heat exchanger, wherein the turbine is configured to direct its outflow of liquid to the heat exchanger and the heat exchanger is configured to direct its outflow of the liquid to the liquid inlet of the injector.

2. A heat engine, comprising:
    a boiler,
    a gas-into-liquid injector, wherein the boiler is configured to direct a flow of gas to the gas inlet of the injector,
    a turbine, wherein the injector is configured to direct the propelled flow of liquid to the inlet of the turbine,
    a heat exchanger, wherein the turbine is configured to direct part of its outflow of liquid to the heat exchanger and the heat exchanger is configured to direct its outflow of the liquid to the liquid inlet of the injector,
    a pump, wherein the turbine is configured to direct part of the resulting outflow of liquid to the inlet of the pump and the pump is configured to direct a flow of liquid to the inlet of the boiler.

3. A heat engine, comprising:
    a boiler,
    a gas-into-liquid injector, wherein the boiler is configured to direct a flow of gas to the gas inlet of the injector,
    a turbine, wherein the injector is configured to direct the propelled flow of liquid to the inlet of the turbine,
    a heat exchanger, wherein the turbine is configured to direct the its outflow of liquid to the heat exchanger and the heat exchanger is configured to direct part of its outflow of the liquid to the liquid inlet of the injector,
    a pump, wherein the heat exchanger is configured to direct part of the resulting outflow of liquid to the inlet of the pump and the pump is configured to direct a flow of liquid to the inlet of the boiler.

4. The engine as claimed in any one of the preceding claims 1, 2 or 3 further comprising
    a control valve and/or a pump,
    wherein the injector is configured to instead of directing part of the flow of liquid to the boiler, to direct that flow of liquid to the control valve and/or pump and
    the control valve and/or pump is configured to direct a flow of liquid to the inlet of the boiler, the control valve and/or pump also controlling the amount of liquid flowing into the boiler.

5. The engine of claim 4 further comprising another heat exchanger, wherein the bypass and/or control valve is configured to direct the flow of liquid to the inlet of the additional heat exchanger and the additional heat exchanger is configured to direct a flow of liquid to the inlet of the steam injector.

6. The engine as claimed in any one of the preceding claims 1, 2 or 3 further comprising
    a bypass and/or control valve, wherein the injector is configured to direct an additional part of the flow of liquid from the outlet of the injector to the bypass and/or control valve and
    the bypass and/or control valve is configured to direct a flow of liquid to the inlet of the injector, the control valve (if present) also controlling the amount of flow passing through it.

7. The engine as claimed in any one of the preceding claims 1, 2 or 3 further comprising a bypass and/or control valve, wherein the injector is configured to direct an additional part of the flow of liquid from the outlet of the injector to the bypass and/or control valve and the bypass and/or control valve is configured to direct a flow of liquid to the inlet of the heat exchanger, the control valve (if present) also controlling the amount of flow passing through it.

8. The engine as claimed in any one of the preceding claims 1, 2 or 3 further comprising a bypass and/or control valve, wherein the turbine is configured to direct an additional part of the flow of liquid from the outlet of the turbine to the bypass and/or control valve and the bypass and/or control valve is configured to direct a flow of liquid to the inlet of the injector, the control valve (if present) also controlling the amount of flow passing through it.

* * * * *